United States Patent
Nguyen

(10) Patent No.: US 6,813,704 B1
(45) Date of Patent: Nov. 2, 2004

(54) CHANGING INSTRUCTION ORDER BY REASSIGNING ONLY TAGS IN ORDER TAG FIELD IN INSTRUCTION QUEUE

(75) Inventor: Hung T. Nguyen, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 487 days.

(21) Appl. No.: 10/028,898

(22) Filed: Dec. 20, 2001

(51) Int. Cl.[7] .............................................. G06F 9/38
(52) U.S. Cl. ...................... 712/214; 712/215; 712/241
(58) Field of Search .............................. 712/214, 215, 712/241

(56) References Cited

U.S. PATENT DOCUMENTS

| | | | | |
|---|---|---|---|---|
| 4,953,121 A | * | 8/1990 | Muller ........................ 712/241 |
| 5,604,912 A | * | 2/1997 | Iadonato et al. ............... 712/23 |
| 5,628,021 A | * | 5/1997 | Iadonato et al. ............... 712/23 |
| 5,961,634 A | * | 10/1999 | Tran ........................... 712/218 |
| 6,253,287 B1 | * | 6/2001 | Green ......................... 711/125 |
| 6,505,295 B1 | * | 1/2003 | Hiraki et al. ................. 712/241 |
| 2001/0054138 A1 | * | 12/2001 | Kawaguchi ................. 712/215 |

* cited by examiner

Primary Examiner—Kenneth S. Kim
(74) Attorney, Agent, or Firm—Hitt Gaines & Boisbrun, P.C.

(57) ABSTRACT

For use in an instruction queue having a plurality of instruction slots, a mechanism for queueing and retiring instructions. In one embodiment, the mechanism includes a plurality of tag fields corresponding to the plurality of instruction slots, and control logic, coupled to the tag fields, that assigns tags to the tag fields to denote an order of instructions in the instruction slots. In addition, the mechanism includes a tag multiplexer, coupled to the control logic, that changes the order by reassigning only the tags.

21 Claims, 3 Drawing Sheets

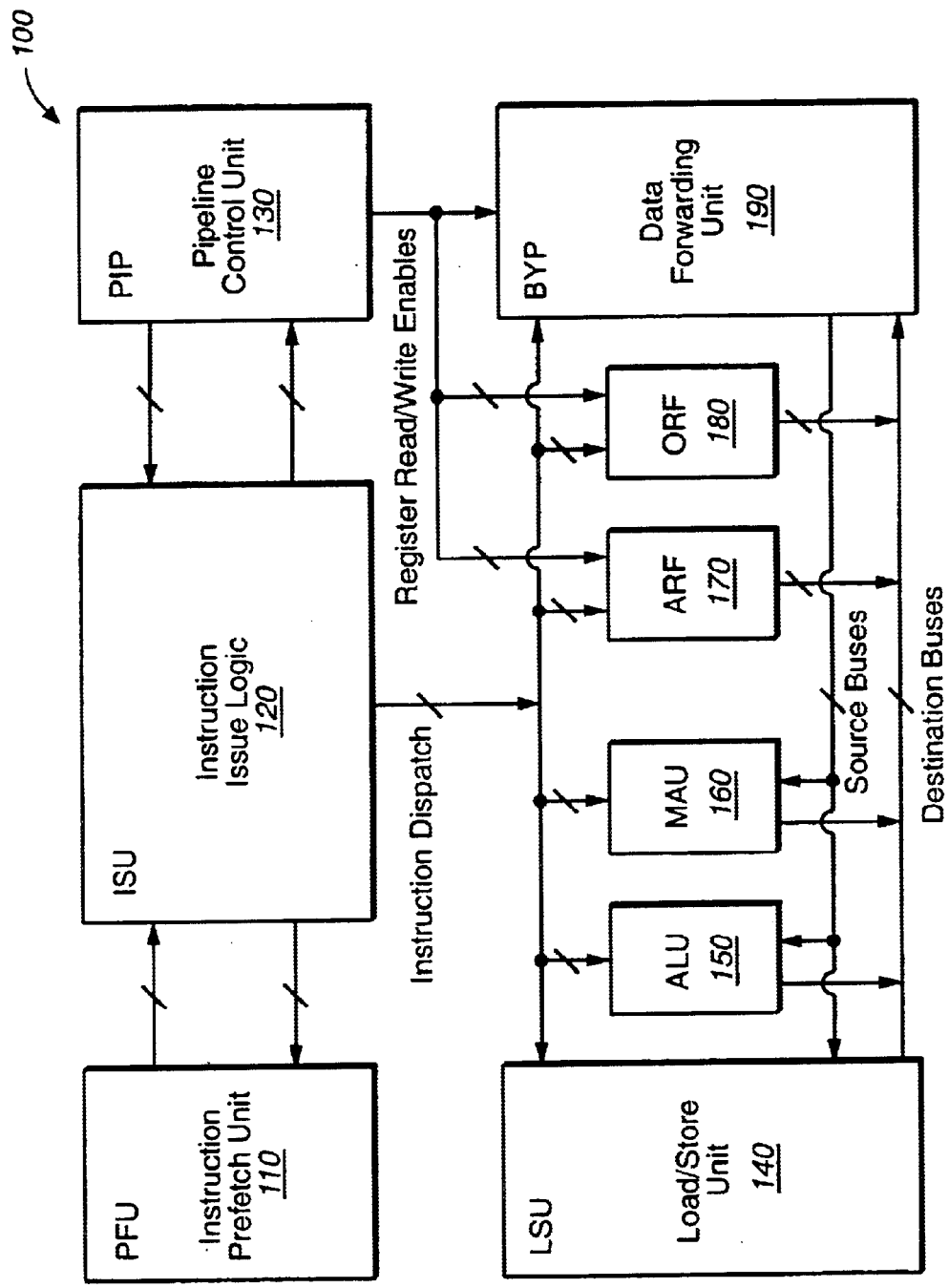
FIG._1

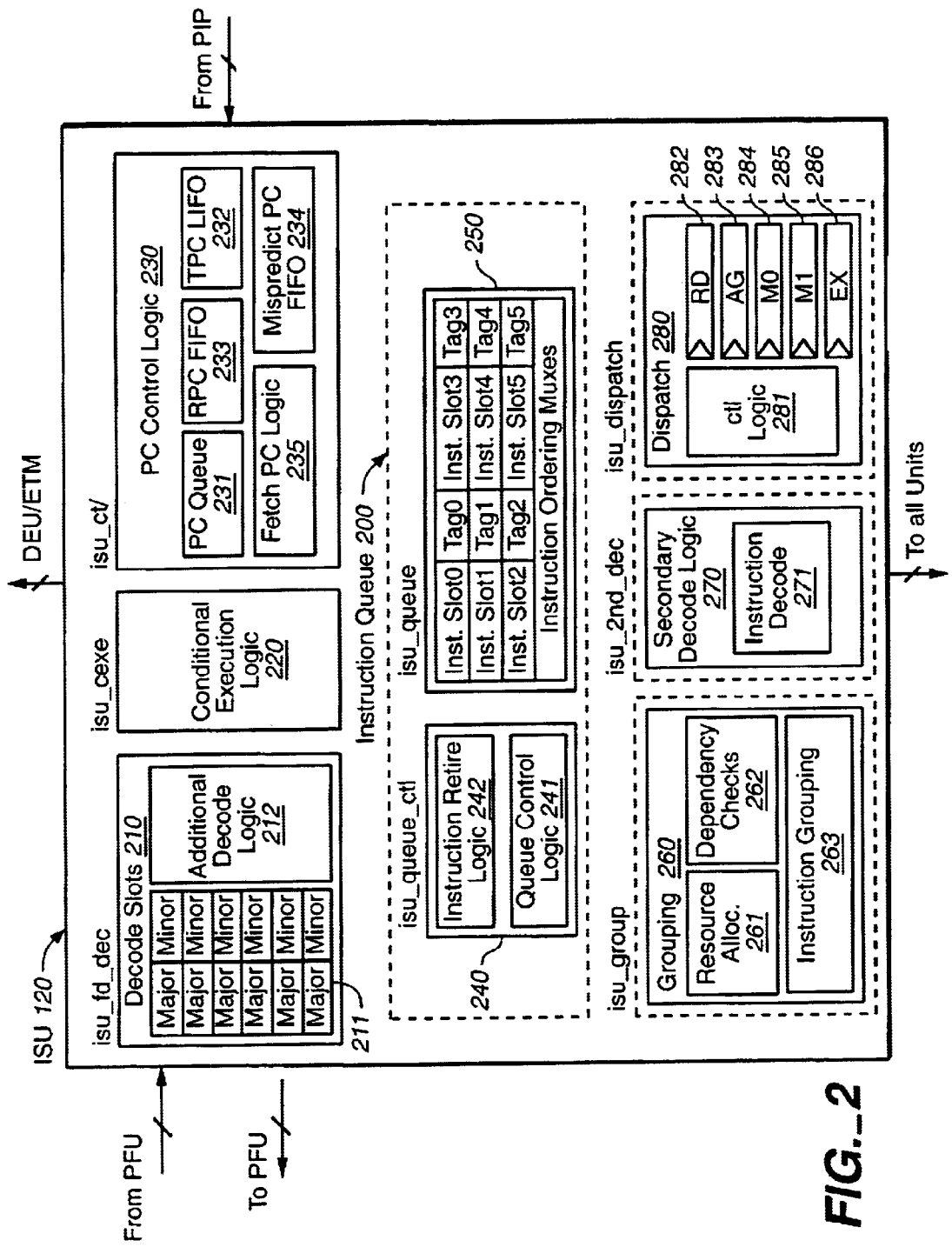
FIG._2

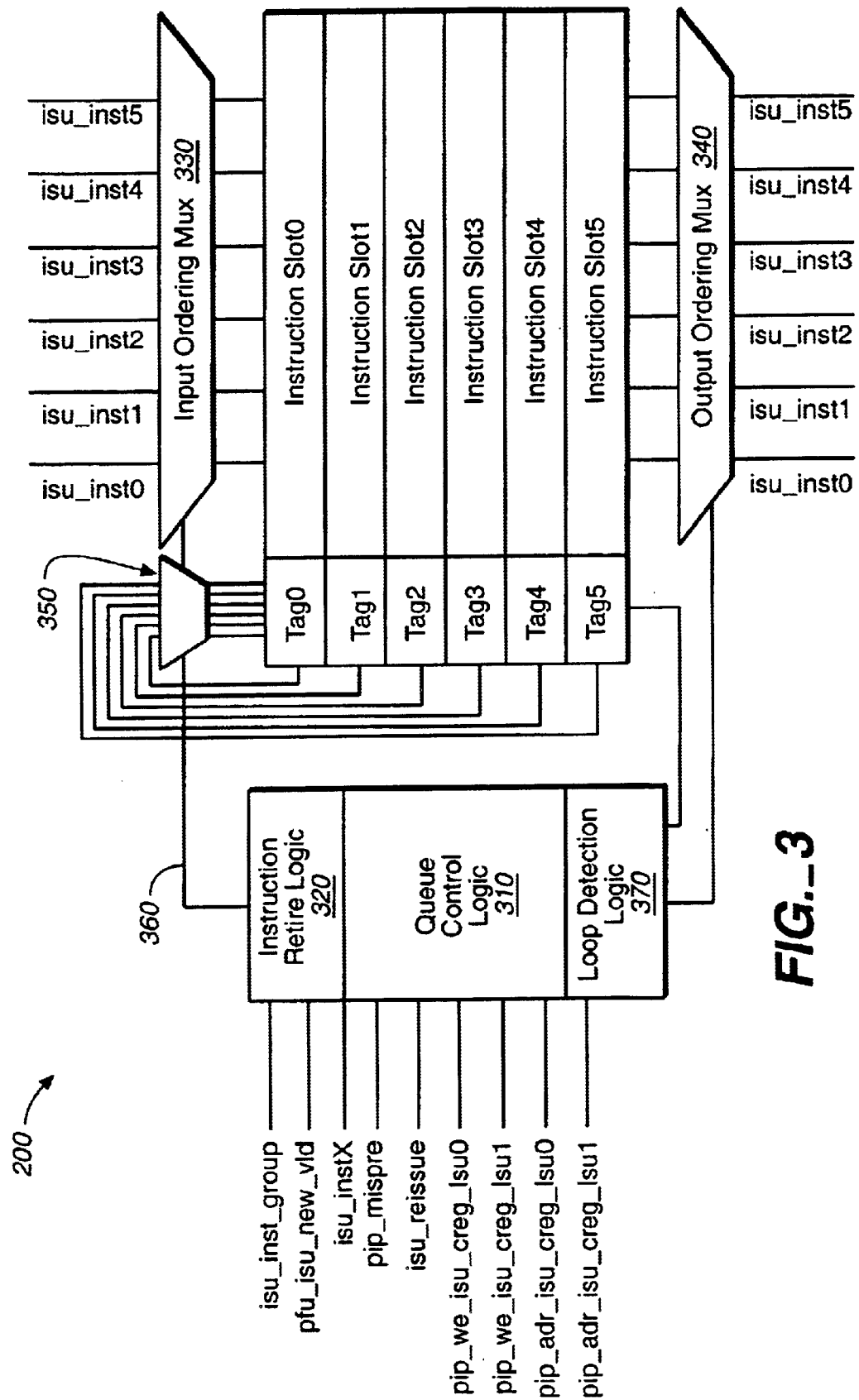
FIG._3

CHANGING INSTRUCTION ORDER BY REASSIGNING ONLY TAGS IN ORDER TAG FIELD IN INSTRUCTION QUEUE

TECHNICAL FIELD OF THE INVENTION

The present invention is directed, in general, to digital signal processors (DSPs) and, more specifically, to a instruction queue for executing and retiring instructions in a DSP.

BACKGROUND OF THE INVENTION

Over the last several years, DSPs have become an important tool, particularly in the real-time modification of signal streams. They have found use in all manner of electronic devices and will continue to grow in power and popularity.

As time has passed, greater performance has been demanded of DSPs. In most cases, performance increases are realized by increases in speed. One approach to improve DSP performance is to increase the rate of the clock that drives the DSP. As the clock rate increases, however, the DSP's power consumption and temperature also increase. Increased power consumption is expensive, and intolerable in battery-powered applications. Further, high circuit temperatures may damage the DSP. The DSP clock rate may not increase beyond a threshold physical speed at which signals may traverse the DSP. Simply stated, there is a practical maximum to the clock rate that is acceptable to conventional DSPS.

An alternate approach to improve DSP performance is to increase the number of instructions executed per clock cycle by the DSP ("DSP throughput"). One technique for increasing DSP throughput is pipelining, which calls for the DSP to be divided into separate processing stages (collectively termed a "pipeline"). Instructions are processed in an "assembly line" fashion in the processing stages. Each processing stage is optimized to perform a particular processing function, thereby causing the DSP as a whole to become faster.

"Superpipelining" extends the pipelining concept further by allowing the simultaneous processing of multiple instructions in the pipeline. Consider, as an example, a DSP in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall DSP speed is "superscalar" processing. Superscalar processing calls for multiple instructions to be processed per clock cycle. Assuming that instructions are independent of one another (the execution of each instruction does not depend upon the execution of any other instruction), DSP throughput is increased in proportion to the number of instructions processed per clock cycle ("degree of scalability"). If, for example, a particular DSP architecture is superscalar to degree three (i.e., three instructions are processed during each clock cycle), the instruction throughput of the DSP is theoretically tripled.

These techniques are not mutually exclusive; DSPs may be both superpipelined and superscalar. However, operation of such DSPs in practice is often far from ideal, as instructions tend to depend upon one another and are also often not executed efficiently within the pipeline stages. In actual operation, instructions often require varying amounts of DSP resources, creating interruptions ("bubbles" or "stalls") in the flow of instructions through the pipeline. Consequently, while superpipelining and superscalar techniques do increase throughput, the actual throughput of the DSP ultimately depends upon the particular instructions processed during a given period of time and the particular implementation of the DSP's architecture.

The speed at which a DSP can perform a desired task is also a function of the number of instructions required to code the task. A DSP may require one or many clock cycles to execute a particular instruction. Thus, in order to enhance the speed at which a DSP can perform a desired task, both the number of instructions used to code the task as well as the number of clock cycles required to execute each instruction should be minimized.

Among superscalar DSPs, some execute instructions in order (so-called "in-order issue" DSPs). In such DSPS, each instruction is written into the slots of a register within an instruction queue of an instruction logic circuit and marked with a "tag" to identify the order of the instructions. Typically, such tags are numerically arranged to specify only the order that the instructions are written into the registers, and not the order of execution of the instructions. At each clock cycle, one or more instructions within the registers are executed ("grouped") in accordance with grouping rules embedded in the DSP. After being grouped, if an instruction is no longer needed, it is simply overwritten ("retired").

Unfortunately, in even the most advanced DSPs found in the prior art, the re-ordering of instructions within the registers of an instruction logic circuit suffers from significant problems. If some instructions within the instruction register are grouped and retired in a given clock cycle in an order that differs from the order in which the instructions were originally written into the register, the remaining instructions are re-ordered within the individual slots of the register.

To illustrate this point, if four instructions are written into four consecutive slots, the instructions are conventionally identified by four consecutive tags associated with the slots. If only the first and third instructions are grouped and retired in a first clock cycle, the second and fourth instructions are re-ordered, or "shifted," within the slots. More specifically, the second and fourth instructions are shifted into the first and second slots, and are thus associated with the first and second tags. Those skilled in the art understand that, since each instruction may comprise a number of data bits, shifting remaining instructions from slot to slot within a register so that they are associated with appropriate tags requires shifting a relatively large number of bits after each clock cycle.

The shifting of such large numbers of bits after each clock cycle typically leads to routing congestion within the instruction queue. In addition, shifting a large number of bits may also result in other routing problems, due primarily to a combination of the complexity of the routing circuit employed and the number of bits shifted. Of course, such routing congestion and other problems typically leads to undesired timing delay within the DSP.

Accordingly, what is needed in the art is an instruction queue for a DSP or other processor that consumes less power than those found in the prior art.

SUMMARY OF THE INVENTION

To address the above-discussed deficiencies of the prior art, the present invention provides for use in an instruction queue having a plurality of instruction slots, a mechanism for queueing and retiring instructions. In one embodiment, the mechanism includes a plurality of tag fields corresponding to the plurality of instruction slots, and control logic, coupled to the tag fields, that assigns tags to the tag fields to denote an order of instructions in the instruction slots. In addition, the mechanism includes a tag multiplexer, coupled to the control logic, that changes the order by reassigning only the tags.

In one embodiment of the present invention, the mechanism further includes loop detection logic, coupled to the control logic, that prevents ones of the instructions that are in a loop from being retired. In addition, the loop detection logic may prevent multiple instructions that are in a loop from being retired.

In one embodiment of the present invention, the mechanism further includes an input ordering multiplexer coupled to the control logic and to the plurality of instruction slots and configured to write the instructions into the plurality of instruction slots. In a related embodiment, the mechanism further includes an output ordering multiplexer coupled to the control logic and to the plurality of instruction slots and configured to retire the at least one of the instructions.

In one embodiment of the present invention, the instruction slots of the mechanism number six and the tags number six. Of course, the mechanism may include any number of instruction slots and tags.

In one embodiment of the present invention, the control logic further determines an order of at least one new instruction and causes the at least one new instruction to be written into at least one of the plurality of instruction slots. In another embodiment, the control logic determines an order of multiple new instructions and causes the multiple new instructions to be written into at appropriate corresponding instruction slots.

In one embodiment of the present invention, the control logic retires all of the instructions in response to receipt of a mispredict signal.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying Figures. It is emphasized that some circuit components may not be illustrated for clarity of discussion, and the exclusion of any components is not intended to limit the scope of the present invention. Reference is now made to the following descriptions taken in conjunction with the accompanying drawings, in which:

FIG. 1 illustrates an exemplary DSP which may form an environment within which an instruction queue constructed according to the principles of the present invention can operate;

FIG. 2 illustrates in greater detail an instruction issue unit of the DSP of FIG. 1, which includes an instruction queue constructed according to the present invention; and FIG. 3 illustrates a schematic of one embodiment of the instruction queue of FIG. 2.

DETAILED DESCRIPTION

Referring initially to FIG. 1, illustrated is an exemplary DSP, generally designated 100, which may form an environment within which an instruction queue constructed according to the principles of the present invention can operate. Those skilled in the pertinent art should understand that the instruction queue of the present invention may be applied to advantage in other conventional or later-discovered DSP or general-purpose, non-DSP, processor architectures.

The DSP 100 contains an instruction prefetch unit (PFU) 110. The PFU 110 is responsible for anticipating (sometimes guessing) and prefetching from memory the instructions that the DSP 100 will need to execute in the future. The PFU 110 allows the DSP 100 to operate faster, because fetching instructions from memory involves some delay. If the fetching can be done ahead of time and while the DSP 100 is executing other instructions, that delay does not prejudice the speed of the DSP 100.

The DSP 100 further contains instruction issue logic (ISU) 120. The ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., arithmetic logic unit, multiply-accumulate unit and address and operand register files) and retiring instructions after they have been executed or are otherwise no longer of use. Accordingly, the ISU 120 cooperates with the PFU 110 to receive prefetched instructions for issuance.

In a normal operating environment, the DSP 100 processes a stream of data (such as voice, audio or video), often in real-time. The DSP 100 is adapted to receive the data stream into a pipeline (detailed in Table 1 below and comprising eight stages). The pipeline is under control of a pipeline control unit (PIP) 130. The PIP 130 is responsible for moving the data stream through the pipeline and for ensuring that the data stream is operated on properly. Accordingly, the PIP 130 coordinates with the ISU 120 to ensure that the issuance of instructions is synchronized with the operation of the pipeline, that data serving as operands for the instructions are loaded and stored in proper place and that the necessary processing resources are available when required.

TABLE 1

| Pipeline Stages | |
| --- | --- |
| Stage | Employed to |
| Fetch/Decode (F/D) | fetch and decode instructions new instructions queued |
| Group (GR) | check grouping and dependency rules valid instructions grouped and retired execute return instructions |
| Read (RD) | read operands for address generation and control register update dispatch valid instructions to all functional units |

TABLE 1-continued

Pipeline Stages

| Stage | Employed to |
| --- | --- |
| | execute move immediate to control register instructions |
| Address Generation (AG) | calculate addresses for all loads and stores execute bit operations on control registers |
| Memory Read 0 (M0) | send registered address and request to the memory subsystem. |
| Memory Read 1 (M1) | load data from the memory subsystem register return data in the ORF (term defined below) read operands for execution from the ORF. |
| Execute (EX) | execute remaining instructions write results to the ORF or send results to BYP (term defined below) |
| Writeback (WB) | register results in the ORF or the ARF (term defined below) |

A load/store unit (LSU) 140 is coupled to, and under the control of, the PIP 130. The LSU 140 is responsible for retrieving the data that serves as operands for the instructions from memory (a process called "loading") and saving that data back to the memory as appropriate (a process called "storing"). Accordingly, though FIG. 1 does not show such, the LSU 140 is coupled to a data memory unit, which manages data memory to load and store data as directed by the LSU 140. The DSP 100 may be capable of supporting self-modifying code (code that changes during its own execution). If so, the LSU 140 is also responsible for loading and storing instructions making up that code as though the instructions were data.

As mentioned above, the DSP 100 contains various processing resources that can be brought to bear in the execution of instructions and the modification of the data in the data stream. An arithmetic logic unit (ALU) 150 performs general mathematical and logical operations (such as addition, subtraction, shifting, rotating and Boolean operations) and is coupled to, and under control of, both the ISU 120 and the PIP 130. A multiply-accumulate unit (MAU) 160 performs multiplication and division calculations and calculations that are substantially based on multiplication or division and, as the ALU 150, is coupled to, and under control of, both the ISU 120 and the PIP 130.

The DSP 100 contains very fast, but small, memory units used to hold information needed by instructions executing in the various stages of the pipeline. That memory is divided into individually designated locations called "registers." Because the various stages of the pipeline employ the registers in their instruction-processing, the registers are directly accessible by the stages. The DSP 100 specifically contains an address register file (ARF) 170 and an operand register file (ORF) 180. As the names imply, the ARF 170 holds addresses (typically corresponding to memory locations containing data used by the stages) and the ORF 180 holds operands (data that can be directly used without having to retrieve it from further memory locations).

Certain data may be required for more than one instruction. For example, the results of one calculation may be critical to a later calculation. Accordingly, a data forwarding unit (BYP) 190 ensures that results of earlier data processing in the pipeline are available for subsequent processing without unnecessary delay.

Though not illustrated in FIG. 1, the DSP 100 has an overall memory architecture that is typical of conventional DSPs and microprocessors. That is, its registers are fast but small; its instruction and date caches (contained respectively in the PFU 110 and the LSU 140 ) are larger, but still inadequate to hold more than a handful of instructions or data; its local instruction memory and data memory are larger still, but may be inadequate to hold an entire program or all of its data. An external memory (not located within the DSP 100 itself) is employed to hold any excess instructions or data.

It should be noted in this context that the illustrated DSP 100 is of a Harvard architecture. Its instruction and data memories are separate, controlled by separate controllers and separately addressed by the PFU 110 and the LSU 140, respectively. Those skilled in the pertinent art should understand, however, that the principles of the present invention are as easily applied to a von Neumann architecture (one in which instruction and data memories are merged into a single logical entity).

Turning now to FIG. 2, illustrated in greater detail is the ISU 120 of FIG. 1, which includes an instruction queue 200 constructed according to the present invention. Recall that the ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., the ALU 150, the MAU 160, the ARF 170 and the ORF 180 ) and retiring instructions after they have been executed, invalidated or are otherwise no longer of use.

The illustrated ISU 120 is capable of decoding and issuing up to six instructions in order. To perform this function, the ISU 120 receives partially decoded instructions from the instruction queue 200 within the PFU 110 of FIG. 1 and communicates with the F/D, GR, RD, AG, M0 and M1 stages of the pipeline to issue the instructions as appropriate.

The ISU 120 contains an instruction decode block isu__fd__dec 210; a conditional execution logic block isu__cexe 220; a program counter (PC) controller isu__ctl 230; the instruction queue 200 (containing an instruction queue control block isu__queue__ctl 240 and an instruction queue register block isu__queue__reg 250 ); an instruction grouping block isu__group 260; a secondary control logic block isu__2nd__dec 270; and a dispatch logic block isu__dispatch 280.

The PFU 110 sends up to six partially-decoded and aligned instructions to isu__fd__dec 210. These instructions are stored in a six slot queue 211. Each slot in the queue 211 consists of major and minor opcode decoders and additional decode logic 212. The instructions are fully decoded in the F/D stage of the pipeline. The instructions in the queue 211 are only replaced (retired) from the queue 211 after having been successfully grouped in the GR stage.

The contents of the queue 211 are sent to grouping logic in the GR stage of the pipeline for hazard detection. Instruction grouping logic 263 within isu__group 260 governs the GR stage. The instruction grouping logic 263 embodies a predefined set of rules, implemented in hardware (including logic 262 devoted to performing dependency checks, e.g., write-after-write, read-after-write and write-after-read), that determines which instructions can be grouped together for execution in the same clock cycle. The grouping process is important to the operation and overall performance of the DSP 100, because instruction opcodes, instruction valid signals, operand register reads and relevant signals are dispatched to appropriate functional units in subsequent pipeline stages based upon its outcome. Resource allocation logic 261 assists in the dispatch of this information.

The conditional execution logic block isu_cexe 220 is responsible for identifying conditional execution (cexe) instructions and tagging the beginning and ending instructions of the cexe blocks that they define in the queue 211. When instructions in a cexe block are provided to the GR stage, they are specially tagged to ensure that the instruction grouping logic 263 groups them for optimal execution.

The PC controller isu_ctl 230 includes a PC register, an trap PC (TPC) register, activated when an interrupt is asserted, and a return PC (RPC) register, activated when a call occurs. These registers have associated queues: a PC queue 231, a TPC last-in, first-out queue 232 and an RPC first-in, first-out queue 233. The PC controller isu_ctl 230 also contains logic to update these registers and queues 231, 232, 233. A mispredict PC register, a mispredict first-in, first-out queue 234 and associated logic keep track of mispredictions. Fetch PC logic 235 controls the prefetching of instructions and, accordingly, the PFU 110 of FIG. 1. Subsequent PCs are calculated based on the number of the instructions grouped in the GR stage and the current state of the DSP 100. The state of the DSP 100 is affected by interrupts, branch mispredictions and return instructions.

The instruction queue 200 (containing isu_queue_ctl 240 and isu_queue_reg 250) actually contains the instructions which are queued for dispatch to the pipeline. In the illustrated embodiment, the instruction queue register block isu_queue_reg 250 has six 91-bit entries and input and output ordering multiplexers (not shown). isu_queue_reg 250 has a variable depth that depends upon the number of instructions grouped therein. isu_queue_ctl 240 contains all isu_queue_reg 250 control logic 241 and instruction retire logic 242. For the purpose of saving power, this instruction retire logic 242 checks for "tight loops." A "tight loop" is defined as a loop that has a maximum of six instructions. A tight loop can and should continue to reside within isu_queue_reg 250 until it has been executed for the last time. This saves power and time by foregoing repeated reloading of the tight loop. As instructions are retired from isu_queue_reg 250, newly decoded instructions in the queue 211 can be written to its empty slots.

The secondary control logic block isu_2nd_dec 270 provides additional instruction decode logic 271 for the GR, RD, M0 and M1 stages of the pipeline. The main function of the additional instruction decode logic 271 is to provide additional information from each instruction's opcode to isu_group 260. The instruction decoders in isu_2nd_dec 270 are the same as those employed in the additional decode logic 212 of isu_fd_dec 210.

Finally, the dispatch logic block isu dispatch 280 includes control logic 281, five native opcode staging registers 282, 283, 284, 285, 286 (corresponding to the RD, AG, M0, M1 and EX stages of the pipeline) and logic (not shown) to generate instruction valid signals. isu_dispatch 280 also transmits register addresses for source and destination registers and read enable signals to the BYP 190, the ORF 180, and the ARF 170. Among other things, the control logic 281 uses grouping information and a branch mispredict signal to determine when the staging registers 282, 283, 284, 285, 286 require updating.

Turning now to FIG. 3, illustrated is a schematic of one embodiment of the instruction queue 200 of FIG. 2. In the illustrated embodiment, the instruction queue 200 includes a register comprised of six instruction slots (slot0–slot5) and six corresponding tag fields (tag0–tag5). Of course, the present invention is not limited to only six slots with corresponding tag fields, but rather is broad enough to include any number of slots and tag fields.

The instruction queue 200 further includes queue control logic 310 and instruction retire logic 320. As illustrated, the queue control logic 310 and instruction retire logic 320 are coupled to the instruction slots slot0–slot5 via an input ordering multiplexer 330 and an output ordering multiplexer 340. First through sixth instructions isu_inst0–isu_inst5 are provided to the input ordering multiplexer 330, perhaps from other components within the ISU 120 of FIG. 2. Once retired, the six instructions isu_inst0–isu_inst5 are subject to being overwritten. In addition, the queue control logic 310 and instruction retire logic 320 are coupled to the tag fields tag0–tag5. The instruction retire logic 320 is also coupled to a tag ordering multiplexer 350. A plurality of input signals are also shown as being provided to the queue control logic 310 and instruction retire logic 320, which are described in greater detail below.

The instruction queue 200 functions as follows. In accordance with conventional practice, instructions isu_inst0–isu_inst5 to be executed are provided to the instruction queue 200 during the processing of instructions in a DSP. The instructions isu_inst0–isu_inst5 enter the input ordering multiplexer 330 and are written into the instruction slots slots0–slots5 in an order determined by the control logic 310. More specifically, the first instruction isu_inst0 is written by the input ordering multiplexer 330 into the first instruction slot slot0, and second instruction isu_inst1 is written into the second instruction slot slot1, and so on until all of the instructions isu_inst0–isu_inst5 have been written into the instruction slots slot0–slot5 in the intended order. As such, the tag fields tag0–tag 5, corresponding to the instruction slots slot0–slot5, identify an order for the instructions isu_inst0–isu_inst5. The order determined by the control logic 310 depends on the specific operation to be carried out on data within a data stream, and the present invention is not limited to any particular order of instructions.

In addition to determining instruction order, the control logic 310 may also determine how many of the instructions isu_inst0–isu_inst5, if any, belong to a single group of instructions, such as a group where all of instructions in the group are dependent upon a condition precedent. Those skilled in the art are familiar with instruction groups dependent on a condition (cexe instructions), however, the present invention is not limited to such groups of instructions. Moreover, the control logic 310 may also determine how many instructions isu_inst0–isu_inst5, if any, belonging to a condition group have not been retired, as well as other functions familiar to those who are skilled in the art.

As certain of the instructions isu_inst0–isu_inst5 are executed or "grouped," one or more of the instructions isu_inst0–isu_inst5 may be retired. More specifically, when an instruction within a DSP has been executed or is otherwise no longer needed, that instruction is said to be "retired" and is purged from its specific instruction slot via the output ordering multiplexer 340. Alternatively, the control logic 310 may simply cause the instruction slot of a retired instruction to be overwritten with a new instruction.

Therefore, as the instructions isu_inst0–isu_inst5 are executed, one or more of the instructions may no longer be needed. As mentioned above, instructions isu_inst0–isu_inst5 may be retired by being overwritten or removed from the instruction slots slot0–slot5 by the output ordering multiplexer 340. The retire logic 320 determines which of the original instructions isu_inst0–isu_inst5 have been retired and which are non-retired. Once this determination has been made, the retire logic 320 will generate an order signal 360 corresponding to an order of the non-retired instructions isu_inst0–isu_inst5 remaining in the register. The order signal 360 is sent to the tag multiplexer 350, as illustrated in FIG. 3.

In accordance with the principles of the present invention, the tag multiplexer 350 alters the order of the tags in the tag fields tag0–tag5 based on the order signal generated by the retire logic 320. The order of the tags in the tag fields tag0–tag5 is changed by the tag multiplexer 350 to correspond to the order of the non-retired instructions isu_inst0–isu_inst5 remaining in the instruction slots slot0–slot5 of the register, with remaining tags assigned to new instructions provided in place of those retired. Stated another way, the remaining non-retired instructions isu_inst0–isu_inst5 are not rotated to different instruction slots slot0–slot5 when some of the instructions isu_inst0–isu_inst5 are retired, as is done in prior art DSPs. Instead, the tags tag0–tag5 used to identify the order of the instruction slots slot0–slot5 are reassigned by the tag multiplexer 350 to reflect the new order resulting after certain instructions isu_inst0–isu_inst5 are retired.

The principles of the present invention, as discussed herein, may be better understood with reference to a specific example of tag updating across several clock cycles. Looking first at Table 2, first through sixth instructions i0–i5 represent original instructions and are written into first through sixth instruction slots slot0–slot5. First through sixth tags tag0–tag5 correspond in order to the first through sixth instructions i0–i5 and the first through sixth instruction slots slot0–slot5. In addition, seventh through tenth instructions i6–i9 represent new instructions awaiting placement into appropriate instruction slots slot0–slot5. At a clock cycle n, the first, second and third instructions i0–i2 are grouped (e.g., executed and retired), while the fourth, fifth and sixth instructions i3–i5 are not grouped.

TABLE 2

Tag Update at Clock Cycle n

| New Instruction | Slot | Instruction | Tag | Status |
| --- | --- | --- | --- | --- |
| i6 | 0 | i0 | 0 | Grouped |
| i7 | 1 | i1 | 1 | Grouped |
| i8 | 2 | i2 | 2 | Grouped |
| i9 | 3 | i3 | 3 | Not Grouped |
| Not Valid | 4 | i4 | 4 | Not Grouped |
| Not Valid | 5 | i5 | 5 | Not Grouped |

Looking at Table 3, at clock cycle n+1, it can be seen that the first, second and third instructions i0–i2 have been retired, and the seventh, eight and ninth instructions i6–i8 written into the first, second and third slots slot0–slot2. In the prior art, the fourth, fifth and sixth instructions i3–i5 would have been rotated and rewritten into the first, second and third slots slot0–slot2, and the seventh, eight and ninth instructions i6–i8 written into the fourth, fifth and sixth slots slot3–slot5. However, in accordance with the principles described herein, rewriting instructions already present in the instruction slots wastes considerable resources. In addition, since instructions are comprised of numerous bits, rotating instructions as such may result in other routing problems, such as routing congestion. Instead, as seen in Table 3, the tags tag0–tag5 associated with the instructions have been reassigned to reflect the proper execution order of the remaining, non-retired instructions.

TABLE 3

Tag Update at Clock Cycle n + 1

| New Instruction | Slot | Instruction | Tag | Status |
| --- | --- | --- | --- | --- |
| i9 | 0 | i6 | 3 | Grouped |
| i10 | 1 | i7 | 4 | Grouped |
| i11 | 2 | i8 | 5 | Not Grouped |
| i12 | 3 | i3 | 0 | Grouped |
| i13 | 4 | i4 | 1 | Grouped |
| Not Valid | 5 | i5 | 2 | Grouped |

Also at clock cycle n+1, it can be seen that the fourth through the eighth instructions i3–i7 have been grouped. The ninth instruction i8 has not been grouped. In addition, tenth through fourteenth new instructions i9–i13 also await writing into appropriate instruction slots slot0–slot5.

At clock cycle n+2, as set forth in Table 4, tenth through fourteenth instructions i9–i13 are written into the appropriately available instruction slots slot0–slot1, slot3–slot5. In this embodiment, the tenth through fourteenth instructions i9–i13 are written into the instruction slots beginning at the first available slot slot3 after the ninth (and oldest) instruction i8. Although writing new instructions in such a manner is advantageous, it is not necessary to practice the present invention. As before, the tags tag0–tag5 associated with the instructions i8–i13 are reassigned to reflect the new execution order. Also as before, the instructions i8–i13 in the register are not rotated to establish the new order. Also at clock cycle n+2, the ninth through fourteenth instructions i8–i13 are grouped, making way for fifteenth through twentieth instructions i14–i19 to be written into the instruction slots slot0–slot5.

TABLE 4

Tag Update at Clock Cycle n + 2

| New Instruction | Slot | Instruction | Tag | Status |
| --- | --- | --- | --- | --- |
| i14 | 0 | i12 | 4 | Grouped |
| i15 | 1 | i13 | 5 | Grouped |
| i16 | 2 | i8 | 0 | Grouped |
| i17 | 3 | i9 | 1 | Grouped |
| i18 | 4 | i10 | 2 | Grouped |
| i19 | 5 | i11 | 3 | Grouped |

In an advantageous embodiment, the instruction queue 200 further includes loop detection logic 370 coupled to the control logic 310. In such embodiment, the loop detection logic 370 may be employed to prevent the control logic 310 from causing instructions isu_inst0–isu_inst5 to be retired if such instructions are determined to be in an instruction loop. More specifically, certain instructions within the register may be used in a "loop" where the instruction is repeatedly executed at different times. Those skilled in the art understand that such loop instructions should not be retired since they will be needed again.

The loop detection logic 370 may be employed, in accordance with the present invention, to prevent any of the instructions isu_inst0–isu_inst5 involved in a loop from being retired and their corresponding tags in the tag fields tag0–tag5 from being reassigned to reflect a different order. In a more specific embodiment, the loop detection logic 370 may be employed to prevent any of the instructions isu_inst0–isu_inst5 involved in a "tight loop" from being retired, where a "tight loop" is defined as a loop having a maximum of six instructions when a maximum of six register slots are available.

Moreover, the instruction queue 200 of the present invention may be particularly beneficial where loop instructions isu_inst0–isu_inst5 are used, so those loop instructions isu_inst0–isu_inst5 are not invalidated after execution. Instead, the instruction queue 200 of the present invention can allow any loop instructions isu_inst0–isu_inst5 to remain valid and in their slots slot0–slot5 with only the tags in the tag fields tag0–tag5 corresponding to those instructions isu_inst0–isu_inst5 being reassigned.

As illustrated, the instruction queue 200 may further include additional input signals from surrounding components. Among those illustrated is an instruction group signal isu_inst_group. The instruction group signal isu_inst_group may be provided to the control logic 310 to establish how many of the incoming instructions have been grouped together during the GR stage of the pipeline. Those skilled in the art understand that determining which instructions are grouped may assist in determining the sets of instructions that should be executed and/or retired together, the instructions depending on the same condition precedent, which instructions may be executed in a loop, as well as other information.

In addition, a new/valid instruction signal pfu_isu_new_vld may be provided to the control logic 310. In such an embodiment, the new/valid instruction signal pfu_isu_new_vld indicates how many new and valid instructions have been decoded in the FD stage of the pipeline for use in the instruction queue 200. The control logic 310 then determines an order of any new instructions and causes the new instructions to be written into instruction slots slot0–slot5. In a related embodiment, an incoming instruction signal isu_instX may also be provided to the control logic 310 to indicate which decoded instructions isu_inst0–isu_inst5 have actually been written into one of the available slots slot0–slot5.

In a preferred embodiment of the present invention, a mispredict signal pip_mispre is also provided to the control logic 310. In accordance with conventional practice, if the mispredict signal pip_mispre is received by the control logic 310, the instructions isu_inst0–isu_inst5 in the register are found to be no longer needed and the instruction slots slot0–slot5 reset for new instruction. For example, a mispredict may occur if a branch was taken during execution of an algorithm that rendered a given set of instructions moot because of the choice made at the branch.

Also in this embodiment, a reissue signal isu_reissue may be provided to the control logic 310. The reissue signal isu_reissue may be employed to inform the control logic 310 that an "improper mispredict" was sent via the mispredict signal pip_mispre. For example, an improper mispredict may occur when a branch taken previously in an algorithm originally caused a "reset" of instructions in the register, but the algorithm has completed the branch and returned to the original branching point. In such a case, the instructions previously discarded are needed again. Of course, other types of improper mispredicts are also within the broad scope of the present invention.

A group of PIP signals pip_we_isu_creg_lsu0, pip_we_isu_creg_lsu1, pip_we_isu_creg_lsu0, pip_we_isu_creg_lsu1 may also be provided to the control logic 310. From these PIP signals pip_we_isu_creg_lsu0, pip_we_isu_creg_lsu1, pip_we_isu_creg_lsu0, pip_we_isu_creg_lsu1, the control logic 310 can determine whether the PIP in the DSP has been modified before all the current instructions have been executed and retired. If the PIP has been modified, the current instructions will most likely be discarded and new instructions decoded and written into the register for execution in accordance with the modification. In addition, if the PIP has been modified, the PIP signals pip_we_isu_creg_lsu0, pip_we_isu_creg_lsu1, pip_we_isu_creg_su0, pip_we_isu_creg_lsu1 may be used to determine how and where the PIP has been modified. With this information, the control logic 310 of the instruction queue 200 may determine the proper instructions to be executed.

By providing a tag multiplexer that reassigns the tags associated with instruction slots in the register of an instruction queue, the present invention provides several benefits over the prior art. For instance, the present invention eliminates the need to rotate the instructions written into the instruction slots as one or more of the instructions therein are retired, to reflect a new order at each clock cycle. By eliminating instruction rotation, routing problems may be substantially prevented. For example, the routing congestion that typically occurs when multiple instructions are rotated in such situations may be eliminated. Those skilled in the art understand that lessening routing problems allows an instruction queue, as well as the overall DSP, to operate more efficiently. Moreover, the principles of the present invention as described herein are employable in almost any DSP, while retaining benefits such as those described above.

Although the present invention has been described in detail, those skilled in the art should understand that they can make various changes, substitutions and alterations herein without departing from the spirit and scope of the invention in its broadest form.

What is claimed is:

1. For use in an instruction queue having a plurality of instruction slots, a mechanism for queueing and retiring instructions, comprising:
   a plurality of tag fields corresponding to said plurality of instruction slots;
   control logic, coupled to said tag fields, that assigns tags to said tag fields to denote an order of instructions in said instruction slots; and
   a tag multiplexer, coupled to said control logic, that changes said order by reassigning only said tags.

2. The mechanism as recited in claim 1, further comprising loop detection logic, coupled to said control logic, that prevents ones of said instructions that are in a loop from being retired.

3. The mechanism as recited in claim 1, further comprising an input ordering multiplexer coupled to said control logic and to said plurality of instruction slots and configured to write said instructions into said plurality of instruction slots.

4. The mechanism as recited in claim 1, further comprising an output ordering multiplexer coupled to said control logic and to said plurality of instruction slots and configured to retire ones of said instructions.

5. The mechanism as recited in claim 1 wherein said instruction slots number six and said tags number six.

6. The mechanism as recited in claim 1 wherein said control logic further determines an order of at least one new instruction and causes said at least one new instruction to be written into at least one of said plurality of instruction slots.

7. The mechanism as recited in claim 1 wherein said control logic retires all of said instructions in response to receipt of a mispredict signal.

8. For use in an instruction queue having a plurality of instruction slots, a method for queueing and retiring instructions, comprising:

providing a plurality of tag fields corresponding to said plurality of instruction slots;

assigning tags to said tag fields to denote an order of instructions in said instruction slots; and changing said order by reassigning only said tags.

9. The method as recited in claim 8, further comprising preventing, with loop detection logic, ones of said instructions that are in a loop from being retired.

10. The method as recited in claim 8, further comprising writing said instructions into said plurality of instruction slots with an input ordering multiplexer coupled to said control logic and to said plurality of instruction slots.

11. The method as recited in claim 8, further comprising retiring said at least one of said instructions with an output ordering multiplexer coupled to said control logic and to said plurality of instruction slots.

12. The method as recited in claim 8 wherein said instruction slots number six and said tags number six.

13. The method as recited in claim 8 further comprising determining an order of at least one new instruction and causing said at least one new instruction to be written into at least one of said plurality of instruction slots.

14. The method as recited in claim 8 further comprising retiring all of said instructions in response to receipt of a mispredict signal.

15. A digital signal processor (DSP), comprising:

a pipeline having stages;

an issue unit including an instruction queue having a plurality of instruction slots;

a plurality of tag fields corresponding to said plurality of instruction slots;

control logic, coupled to said tag fields, that assigns tags to said tag fields to denote an order of instructions in said instruction slots; and a tag multiplexer, coupled to said control logic, that changes said order by reassigning only said tags.

16. The DSP as recited in claim 15, further comprising loop detection logic, coupled to said control logic, that prevents ones of said instructions that are in a loop from being retired.

17. The DSP as recited in claim 15, further comprising an input ordering multiplexer coupled to said control logic and to said plurality of instruction slots and configured to write said instructions into said plurality of instruction slots.

18. The DSP as recited in claim 15, further comprising an output ordering multiplexer coupled to said control logic and to said plurality of instruction slots and configured to retire at least one of said instructions.

19. The DSP as recited in claim 15 wherein said instruction slots number six and said tags number six.

20. The DSP as recited in claim 15 wherein said control logic further determines an order of at least one new instruction and causes said at least one new instruction to be written into at least one of said plurality of instruction slots.

21. The DSP as recited in claim 15 wherein said control logic retires all of said instructions in response to receipt of a mispredict signal.

\* \* \* \* \*